(12) United States Patent
Bitossi et al.

(10) Patent No.: US 6,605,554 B1
(45) Date of Patent: Aug. 12, 2003

(54) GLASS-CERAMICS PROCESS FOR THEIR PREPARATION AND USE

(75) Inventors: Marco Bitossi, Montelupo Fiorentino (IT); Giovanni Baldi, Montespertoli (IT); Davide Settembre Blundo, Reggio Emilia (IT); Enrico Generali, Modena (IT)

(73) Assignee: Colorobbia Italia S.p.A., Sovigliana Vinci (IT)

( * ) Notice: Subject to any disclaimer, the term of this patent is extended or adjusted under 35 U.S.C. 154(b) by 0 days.

(21) Appl. No.: 09/485,270

(22) PCT Filed: Aug. 11, 1997

(86) PCT No.: PCT/EP97/04387

§ 371 (c)(1),
(2), (4) Date: Feb. 7, 2000

(87) PCT Pub. No.: WO99/07651

PCT Pub. Date: Feb. 18, 1999

(51) Int. Cl.$^7$ .............................. C03C 10/06; C03C 8/02
(52) U.S. Cl. ................. 501/10; 501/9; 501/14; 501/17; 501/16; 501/32; 106/483; 106/489
(58) Field of Search ............................. 501/8, 9, 14, 17, 501/32, 16; 106/483, 489

(56) References Cited

U.S. PATENT DOCUMENTS

| | | | | | |
|---|---|---|---|---|---|
| 3,840,394 A | * | 10/1974 | Eppler | ........................ | 501/14 |
| 4,855,259 A | * | 8/1989 | Claussen et al. | ................ | 501/9 |
| 4,888,314 A | * | 12/1989 | Bernier et al. | ................. | 501/9 |
| 5,552,349 A | * | 9/1996 | Ichii et al. | ..................... | 501/9 |
| 5,607,885 A | * | 3/1997 | Ichii et al. | ..................... | 501/9 |

FOREIGN PATENT DOCUMENTS

| | | | |
|---|---|---|---|
| JP | 54-488815 | * | 4/1979 |
| JP | 11-17294 | * | 1/1999 |

OTHER PUBLICATIONS

Patent Abstracts of Japan, vol. 011, No. 268 (C–444), Aug. 29, 1987—JP 62 072539 A (Asahi Glass Co. Ltd. 3, Apr. 3, 1987.

M. H. Lewis: "Glasses and Glass–Ceramics" 1989, Chapman and Hall, London XP002061498 No. month.

\* cited by examiner

*Primary Examiner*—Karl Group
(74) *Attorney, Agent, or Firm*—Hedman & Costigan, P.C.

(57) ABSTRACT

The present invention refers to glass-ceramics consisting of the mixtures (I): $ZrO_2$—$SiO_2$—$Me^{II}O$, or (II) $SiO_2$—$Me^{III}O_2$—$Me^{II}O$, wherein: $Me^{II}$ is chosen in the group consisting of: Ca, Ba, Mg, Zn or mixture thereof; $Me^{III}$ is chosen in the group consisting of Al, B or mixtures thereof; each of the above said constituents being present in determined quantities; the invention refers also to a process for preparing the glass-ceramics above defined; porcelain stonewares and glazes containing them and their use for preparing ceramic items.

11 Claims, No Drawings

GLASS-CERAMICS PROCESS FOR THEIR PREPARATION AND USE

FIELD OF THE INVENTION

The present invention refers to glass-ceramic consisting of the mixtures (I) or (II):

$$ZrO_2—SiO_2—Me"O \quad (I)$$

$$SiO_2—Me_2'''O_3 \quad (II)$$

wherein in mixture (I):

Me"=Ca, Ba, Mg, Zn or mixtures thereof:
and the percentage, in weight, for each component is:
  $ZrO_2$ 5–25%
  $SiO_2$ 45–75%
  MeO" 15–45%
and in mixture (II)
  Me"O is as above defined;
  Me'''=Al, B or mixtures thereof
and the percentage in weight for each of the above said components is:
  $SiO_2$ 30–65%
  $Me_2'''O_3$ 5–25%
  Me"O 5–40% characterized in that the glass ceramics are obtained in the form of powders.

STATE OF THE ART

It is known that glass is an amorphous material obtained by melting of crystalline compounds followed by cooling down of the melted mass. On the contrary glass-ceramics (hereinafter indicated as GC) are vitreous systems that, when brought to a temperature $T_1$ higher then their glass transition temperature $T_g$, present the formation of crystal nuclei (homogeneous or heterogeneous) with following crystal growth. Porcelain stoneware (also defined as ceramic body having absorption </=0.5%, according to ISO 13006 annnex B1A) is a ceramic material prepared starting from natural crystalline products which, submitted to a syntherization process, partially melt and are transformed into new crystalline phases. This products are prepared starting from a mixture of clay minerals, fondents and possibly eutectic promoters. Glaze is a ceramic product consisting of fondents and silica based glasses which are grinded in granules of the wanted dimensions and thereafter applied on the appropriate substrate and heated so that the grinded granules melt (totally or partially) covering the substrate surface.

All the above said products, having a vitreous surface, confer impermeability and higher physico-chemical properties (better resistance to chemical agents, abrasion etc.) to porous substrates. Moreover they play a very important role as aesthetic materials due to the use of lead based fondents, opacifiers (represented by dispersions of, for example, tin oxide or zirconium silicate which are added in the form of crystals having a determined granulometric dimensions) and coloured pigments.

In JP-A-62 072539 a crystallised glass is described which is obtained by molding glass containing $SiO_2$ and $ZrO_2$ as the essential components and crystallising it at 750–1300° C. to deposit tetragonal zirconia in the glass.

However the known materials do not completely satisfy the market needs in so far as the physico-chemical properties are concerned and also their opacization (and the consequent white index) is not always satisfactory giving final products which are aesthetically not suitable for the appropriate use; moreover the known processes for the production of glass-ceramics involve high costs and waste of energy.

DETAILED DESCRIPTION OF THE INVENTION

The invention solves the above said problems thanks to new glass-ceramic having the composition reported above and characterized in that the glass ceramics are obtained in the form of powders.

The glass-ceramic according to the invention can be used as such in order to obtain ceramics or can be added to the materials usually employed for preparing porcelain stoneware or glazes.

The use of the glass-ceramics according to the invention allows (thanks to their "in situ" crystallization) to confer to glaze an exceptional opacization which results in an higher white index (WI) compared to that obtained with the normal opacifiers added to glass, moreover, thanks to the chemical stability and high mechanical resistance of the crystalline phase recrystallized on the glaze surface, they confer to the substrate physico-chemical properties higher then those of the traditional glazes.

The glass-ceramics according to the invention allow also the preparation of ceramics directly from the melted mass which can be shaped in the desired form or the preparation of the wanted ceramic items by tape casting of slurries or hot and cold pressing of the powders.

In the following TABLE 1 preferred glass-ceramic according to the invention are reported (the percentage of the components is given in weight):

TABLE 1

| Comp. | SiO2 | CaO | ZrO2 | BaO | ZnO | MgO | Al2O3 | B2O3 |
|-------|------|------|------|------|------|------|-------|------|
| GC.1  | 55   | 33   | 12   |      |      |      |       |      |
| GC.2  | 52.5 | 31.3 | 16.2 |      |      |      |       |      |
| GC.3  | 55   | 21   | 12   | 12   |      |      |       |      |
| GC.4  | 52.3 | 21.9 | 16.4 |      | 9.4  |      |       |      |
| GC.5  | 55   | 11   | 12   | 11   |      | 11   |       |      |
| GC.6  | 51.6 |      |      |      |      | 39.7 | 8.7   |      |
| GC.7  | 37.8 | 17.63|      | 37.98|      |      | 6.59  |      |
| GC.8  | 47.95| 23.55|      |      |      | 9.3  | 19.2  |      |
| GC.9  | 41   | 0.5  |      |      | 30   |      | 20.5  | 8    |
| GC.10 | 36.77|      |      |      | 47.05|      | 9.75  | 6.43 |
| GC.11 | 61   | 24   |      |      |      |      | 15    |      |

The glass-ceramics according to the present invention can be prepared according to a process which is substantially similar to the one followed for the production of porcelain stoneware consisting in the grinding/mixing/pressing (and following firing of the pressed materials) of powders with the difference that in this case the powders consists only of glass (i.e. they lack the crystalline starting materials used for the production of porcelain stoneware).

However, it is essential that the firing step is performed according to well defined and controlled thermic cycles in order to develop the wanted properties.

In particular, once the $T_g$ (transition temperature) and the $T_c$ (crystallization temperature/s) of the material are determined (according to usual methods) the thermic cycle must be performed as follows:

starting from room temperature the powder mixture is heated increasing the temperature by 10°–30° C. per minute up to 350° C. (in order to eliminate the organic impurities according to usual processes) thereafter the heating temperature is increased by 10°–30° C. per minute up to the $T_g$ maintaining the temperature at this value for 0–120', thereafter the temperature is increased by 10°–30° C. per minute up to the $T_c$ were it is maintained for 0–several hours, for example up to seven hours, preferably for 0–4 hours, and possibly increased by 10°–30° C. up to the next $T_c$ and so on up to the final $T_c$; once completed the heating (i.e. once the highest $T_c$ has been reached) the mass is cooled down to room temperature.

As above said the glass-ceramics according to the invention can be added to the materials normally used for the production of porcelain stoneware; the adding of the glass-ceramics according to the invention allows the production of ceramics via the process normally used for the production of porcelain stoneware this resulting in an important saving of energy.

For example a glass-ceramic according to the invention is added to a traditional mixture of starting materials for the production of porcelain stoneware; the mixture is loaded in a Alsing ball-mill (continuous or discontinuous) and grinded in the presence of water to give a slurry which is dried in an atomizer forming hollow grains. The grains are shaped in the form of tiles by traditional pressing. The tiles are dried and fired in a traditional furnace at 900°–1230° C. giving the final product. The obtained tiles are constituted of syntherized and crystallized materials and a residual vitreous phase as demonstrated by mineral and X-ray analysis of the file surface.

Preferably the glass-ceramics according to the invention are added to the traditional materials in a quantity comprised between 5% and 65% (in weight). In TABLE 2 it is reported (expressed in metal oxide percentage in weight) an example of the composition of a mixture of starting materials which is added to the glass-ceramics of the present invention in the above reported quantities:

TABLE 2

| | |
|---|---|
| SiO2 | 40–80 |
| Al2O3 | 5–40 |
| MgO | 0.1–10 |
| CaO | 0.1–10 |
| Na2O | 0.1–10 |
| K2O | 0.1–10 |

In this connection it was surprisingly found, and it is another object of the present invention, that also other glass-ceramics, already known "per se", can be added to the traditional starting materials for production of porcelain stoneware giving similar advantageous results.

Examples of already known glass-ceramics (a–d) which can be used for the above said purpose are given in following TABLE 3 (the percentage is expressed in weight).

TABLE 3

| Glass-ceramic | SrO | Al2O3 | SiO2 | ZrO | K2O | MgO |
|---|---|---|---|---|---|---|
| a | 30–40 | 25–30 | 30–45 | | | |
| b | | 40–50 | 10–25 | 30–40 | | |
| c | | 15–25 | 60–70 | | 10–20 | |
| d | 20–25 | 10–25 | 45–55 | | | 5–15 |

The glazes can be produced via the processes traditionally used for the production of glazes. A glass-ceramic according to the invention and a starting material usually employed for the production of ceramic glazes (which are essentially the same reported for the preparation of porcelain stoneware with the addition of fondents like frits or borates or lead oxide etc.) were loaded in the appropriated proportions in a Alsing ball-mill in the presence of water and grinded to obtain a so called "glaze" which was applied by airbrush, threading die, bell or serigraphy on a traditional substrate, crude or biscuited, obtained by pressing of atomized or dry-grinded powders. The glaze, dried and/or granulated, can be deposited on the substrate surface by falling and fixed on the surface with appropriated ligants. The substrate is fired at 900°–1230° C. in a quick- or tunnel-furnace (continuous or discontinuous) giving the final product in which the glass-ceramic has induced a controlled crystallization. The glazed tiles so obtained present therefore a vitreous and a crystallized part which confer a very well defined microstructure as shown by SEM and X-rays diffractometry.

Preferably the glass-ceramics according to the invention are added to the traditional materials in a quantity comprised between 5% and 60% (in weight).

EXAMPLE 1

Preparation of Porcelain Stoneware (Corresponding to Example 2 in TABLE 4)

GC2 (50% of the total weight) is loaded in a discontinuous Alsing ball-mill together with the traditional starting materials (see ex.2 in TABLE 4) (50% of the total weight).

Water (up to 50% in weight of the material loaded) and 0.4% in weight of sodium tripolyphosphate (as fluidizer) are added.

The mixture is grinded until the slurry residue on a 63 micron sieve is 0.7–1% (in weight).

The slurry is poured into a tank under mechanical stirring and thereafter is spray dried leaving about 6% of water which is the ideal quantity for the following pressing operation.

The humid powder is pressed at 250–500 kg/cm$^2$ in the wanted shapes and heated in a furnace at 1230° C.

By repeating the process described in Example 1 but using the products and the quantities indicated in the following TABLES 4–13 other porcelain stonewares were obtained; the glass-ceramics are indicated making reference to TABLE 1 and the quantities are expressed in % in weight:

TABLE 4

| Traditional Materials | Glass-ceramics according to invention | % Glass-ceramics | % Traditional materials |
|---|---|---|---|
| SiO$_2$ 76.0 | GC2 | 5 | 95 |
| Al$_2$O$_3$ 17.8 | | | |
| MgO 0.8 | | | |
| CaO 1.0 | | | |
| Na$_2$O 2.3 | | | |
| K$_2$O 2.1 | | | |
| SiO$_2$ 54.6 | GC2 | 50 | 50 |
| Al$_2$O$_3$ 41.8 | | | |
| MgO 0.2 | | | |
| CaO 0.7 | | | |
| Na$_2$O 0.4 | | | |
| K$_2$O 2.3 | | | |
| SiO$_2$ 54.5 | GC2 | 65 | 35 |
| Al$_2$O$_3$ 42.5 | | | |
| MgO 0.2 | | | |
| CaO 0.5 | | | |
| Na$_2$O 0.3 | | | |
| K$_2$O 2.0 | | | |

TABLE 5

| Traditional Materials | Glass-ceramics according to invention | % Glass-ceramics | % Traditional materials |
|---|---|---|---|
| $SiO_2$ 3.5<br>$Al_2O_3$ 18.1<br>MgO 0.8<br>CaO 1.0<br>$Na_2O$ 3.5<br>$K_2O$ 3.1 | GC3 | 5 | 95 |
| $SiO_2$ 84.0<br>$Al_2O_3$ 10.3<br>MgO 0.3<br>CaO 0.7<br>$Na_2O$ 2.4<br>$K_2O$ 2.3 | GC3 | 50 | 50 |
| $SiO_2$ 56.3<br>$Al_2O_3$ 39.5<br>MgO 0.3<br>CaO 0.6<br>$Na_2O$ 1.3<br>$K_2O$ 2.0 | GC3 | 65 | 35 |

TABLE 6

| Traditional Materials | Glass-ceramics according to invention | % Glass-ceramics | % Traditional materials |
|---|---|---|---|
| $SiO_2$ 74.8<br>$Al_2O_3$ 20.1<br>MgO 0.7<br>CaO 1.1<br>$Na_2O$ 1.2<br>$K_2O$ 2.1 | GC4 | 5 | 95 |
| $SiO_2$ 61.3<br>$Al_2O_3$ 35.3<br>MgO 0.3<br>CaO 0.1<br>$Na_2O$ 1.2<br>$K_2O$ 1.8 | GC4 | 50 | 50 |
| $SiO_2$ 60.0<br>$Al_2O_3$ 37.0<br>MgO 0.2<br>CaO 0.8<br>$Na_2O$ 1.0<br>$K_2O$ 1.0 | GC4 | 65 | 35 |

TABLE 7

| Traditional Materials | Glass-ceramics according to invention | % Glass-ceramics | % Traditional materials |
|---|---|---|---|
| $SiO_2$ 72.2<br>$Al_2O_3$ 15.5<br>MgO 0.9<br>CaO 1.3<br>$Na_2O$ 4.0<br>$K_2O$ 3.1 | GC5 | 5 | 95 |
| $SiO_2$ 81.5<br>$Al_2O_3$ 12.0<br>MgO 0.2<br>CaO 1.0<br>$Na_2O$ 2.2<br>$K_2O$ 3.1 | GC5 | 50 | 50 |
| $SiO_2$ 58.5<br>$Al_2O_3$ 37.3<br>MgO 0.3<br>CaO 0.6<br>$Na_2O$ 1.0<br>$K_2O$ 2.3 | GC5 | 65 | 35 |

TABLE 8

| Traditional Materials | Glass-ceramics according to invention | % Glass-ceramics | % Traditional materials |
|---|---|---|---|
| $SiO_2$ 76.0<br>$Al_2O_3$ 17.8<br>MgO 0.8<br>CaO 1.0<br>$Na_2O$ 2.3<br>$K_2O$ 2.1 | GC9 | 5 | 95 |
| $SiO_2$ 62.8<br>$Al_2O_3$ 25.8<br>MgO 0.2<br>CaO 0.9<br>$Na_2O$ 7.1<br>$K_2O$ 3.2 | GC9 | 50 | 50 |
| $SiO_2$ 63.6<br>$Al_2O_3$ 31.6<br>MgO 0.3<br>CaO 1.1<br>$Na_2O$ 1.0<br>$K_2O$ 2.4 | GC9 | 65 | 35 |

TABLE 9

| Traditional Materials | Glass-ceramics according to invention | % Glass-ceramics | % Traditional materials |
|---|---|---|---|
| $SiO_2$ 75.9<br>$Al_2O_3$ 17.7<br>MgO 0.8<br>CaO 1.0<br>$Na_2O$ 2.5<br>$K_2O$ 2.1 | GC6 | 5 | 95 |
| $SiO_2$ 72.8<br>$Al_2O_3$ 10.1<br>MgO 6.7<br>CaO 0.2<br>$Na_2O$ 7.5<br>$K_2O$ 2.7 | GC6 | 50 | 50 |
| $SiO_2$ 67.0<br>$Al_2O_3$ 20.0<br>MgO 2.2<br>CaO 0.4<br>$Na_2O$ 7.8<br>$K_2O$ 2.6 | GC6 | 65 | 35 |

TABLE 10

| Traditional Materials | Glass-ceramics according to invention | % Glass-ceramics | % Traditional materials |
|---|---|---|---|
| $SiO_2$ 74.0<br>$Al_2O_3$ 14.2<br>MgO 1.5<br>CaO 1.5<br>$Na_2O$ 4.2<br>$K_2O$ 4.6 | GC7 | 5 | 95 |
| $SiO_2$ 72.6<br>$Al_2O_3$ 14.8<br>MgO 1.3<br>CaO 2.0<br>$Na_2O$ 9.0<br>$K_2O$ 0.3 | GC7 | 50 | 50 |
| $SiO_2$ 65.9<br>$Al_2O_3$ 23.6<br>MgO 0.2<br>CaO 0.9<br>$Na_2O$ 9.1<br>$K_2O$ 0.3 | GC7 | 65 | 35 |

TABLE 11

| Traditional Materials | | Glass-ceramics according to invention | % Glass-ceramics | % Traditional materials |
|---|---|---|---|---|
| SiO$_2$ | 74.3 | GC8 | 5 | 95 |
| Al$_2$O$_3$ | 15.8 | | | |
| MgO | 1.5 | | | |
| CaO | 2.2 | | | |
| Na$_2$O | 3.7 | | | |
| K$_2$O | 2.5 | | | |
| SiO$_2$ | 68.0 | GC8 | 50 | 50 |
| Al$_2$O$_3$ | 26.8 | | | |
| MgO | 2.2 | | | |
| CaO | 0.4 | | | |
| Na$_2$O | 1.0 | | | |
| K$_2$O | 1.6 | | | |
| SiO$_2$ | 67.0 | GC8 | 65 | 35 |
| Al$_2$O$_3$ | 28.0 | | | |
| MgO | 1.8 | | | |
| CaO | 1.2 | | | |
| Na$_2$O | 0.3 | | | |
| K$_2$O | 1.7 | | | |

TABLE 12

| Traditional Materials | | Glass-ceramics according to invention | % Glass-ceramics | % Traditional materials |
|---|---|---|---|---|
| SiO$_2$ | 74.0 | GC10 | 5 | 95 |
| Al$_2$O$_3$ | 17.6 | | | |
| MgO | 1.8 | | | |
| CaO | 1.4 | | | |
| Na$_2$O | 3.7 | | | |
| K$_2$O | 1.5 | | | |
| SiO$_2$ | 69.0 | GC10 | 50 | 50 |
| Al$_2$O$_3$ | 26.8 | | | |
| MgO | 1.2 | | | |
| CaO | 0.4 | | | |
| Na$_2$O | 1.0 | | | |
| K$_2$O | 1.6 | | | |
| SiO$_2$ | 67.9 | GC10 | 65 | 35 |
| Al$_2$O$_3$ | 28.5 | | | |
| MgO | 1.0 | | | |
| CaO | 1.1 | | | |
| Na$_2$O | 0.4 | | | |
| K$_2$O | 1.1 | | | |

TABLE 13

| Traditional Materials | | Glass-ceramics according to invention | % Glass-ceramics | % Traditional materials |
|---|---|---|---|---|
| SiO$_2$ | 78.0 | GC11 | 5 | 95 |
| Al$_2$O$_3$ | 10.8 | | | |
| MgO | 2.2 | | | |
| CaO | 0.4 | | | |
| Na$_2$O | 6.0 | | | |
| K$_2$O | 2.6 | | | |
| SiO$_2$ | 70.1 | GC11 | 50 | 50 |
| Al$_2$O$_3$ | 14.9 | | | |
| MgO | 8.7 | | | |
| CaO | 0.1 | | | |
| Na$_2$O | 4.3 | | | |
| K$_2$O | 1.9 | | | |
| SiO$_2$ | 69.0 | GC11 | 65 | 35 |
| Al$_2$O$_3$ | 27.0 | | | |
| MgO | 1.0 | | | |
| CaO | 1.1 | | | |
| Na$_2$O | 1.0 | | | |
| K$_2$O | 0.9 | | | |

EXAMPLE 2

Preparation of Glazes (Corresponding to Example 1 in TABLE 14)

GC2 (30% in weight) was loaded in a discontinuous Alsing ball-mill together with the traditional starting materials (see Ex.1 in TABLE 14) (50% of the total weight).

Water (up to 50% in weight of the total material loaded), sodium tripolyphosphate (as fluidizer) (0.4% in weight) and hydroxymethylcellulose (0.3%) (as ligant) are added.

The mixture is grinded until the slurry residue on a 16000 micron sieve is about 2%.(in weight).

The slurry is bell applied (500 g–2.5 Kg) on a pressed substrate which is heated in a furnace at 1160° C.

By repeating the process described in Example 2 but using the products indicated in the following TABLES 14–23 other glazes were prepared; the glass-ceramics are indicated making reference to TABLE 1 and the quantities are expressed in % in weight.

In each TABLE are reported the starting materials and the corresponding to quantities for the preparation of two different glazes (indicated as Glaze I and Glaze II) starting from the same glass-ceramic according to the invention and the same traditional starting compounds but using different quantities of the same.

TABLE 14

| Traditional starting materials and/or frits | | Glass-ceramic | Glaze I | Glaze II |
|---|---|---|---|---|
| | | GC2 | 30 | 50 |
| SiO$_2$ | 54.0 | | 70 | 50 |
| Al$_2$O$_3$ | 33.0 | | | |
| MgO | 0.3 | | | |
| CaO | 0.7 | | | |
| Na$_2$O | 8.0 | | | |
| K$_2$O | 4.0 | | | |

TABLE 15

| Traditional starting materials and/or frits | | Glass-ceramic | Glaze I | Glaze II |
|---|---|---|---|---|
| | | GC3 | 30 | 50 |
| SiO$_2$ | 60.0 | | 70 | 50 |
| Al$_2$O$_3$ | 31.8 | | | |
| MgO | 0.2 | | | |
| CaO | 0.8 | | | |
| Na$_2$O | 6.2 | | | |
| K$_2$O | 1.0 | | | |

TABLE 16

| Traditional starting materials and/or frits | | Glass-ceramic | Glaze I | Glaze II |
|---|---|---|---|---|
| | | GC4 | 30 | 50 |
| SiO$_2$ | 60.0 | | 70 | 50 |
| Al$_2$O$_3$ | 31.2 | | | |
| MgO | 0.4 | | | |
| CaO | 0.8 | | | |
| Na$_2$O | 6.0 | | | |
| K$_2$O | 1.6 | | | |

TABLE 17

| Traditional starting materials e/o frits | | Glass-ceramic | Glaze I | Glaze II |
|---|---|---|---|---|
| | | GC5 | 30 | 50 |
| $SiO_2$ | 60.0 | | 70 | 50 |
| $Al_2O_3$ | 28.0 | | | |
| MgO | 0.0 | | | |
| CaO | 5.0 | | | |
| $Na_2O$ | 3.0 | | | |
| $K_2O$ | 2.0 | | | |
| $SnO_2$ | 2.0 | | | |

TABLE 18

| Traditional starting materials and/or frits | | Glass-ceramic | Glaze I | Glaze II |
|---|---|---|---|---|
| | | GC9 | 30 | 50 |
| $SiO_2$ | 58.0 | | 70 | 50 |
| $Al_2O_3$ | 18.0 | | | |
| MgO | 2.5 | | | |
| CaO | 10.5 | | | |
| $Na_2O$ | 6.0 | | | |
| $K_2O$ | 5.0 | | | |

TABLE 19

| Traditional starting materials and/or frits | | Glass-ceramic | Glaze I | Glaze II |
|---|---|---|---|---|
| | | GC6 | 30 | 50 |
| $SiO_2$ | 59.0 | | 70 | 50 |
| $Al_2O_3$ | 10.0 | | | |
| MgO | 1.0 | | | |
| CaO | 7.0 | | | |
| $Na_2O$ | 8.0 | | | |
| $K_2O$ | 3.0 | | | |
| $ZrO_2$ | 12.0 | | | |

TABLE 20

| Traditional starting materials and/or frits | | Glass-ceramic | Glaze I | Glaze II |
|---|---|---|---|---|
| | | GC7 | 30 | 50 |
| $SiO_2$ | 60.0 | | 70 | 50 |
| $Al_2O_3$ | 17.1 | | | |
| MgO | 2.4 | | | |
| $Na_2O$ | 6.2 | | | |
| $K_2O$ | 4.3 | | | |
| $ZrO_2$ | 8.0 | | | |
| $TiO_2$ | 2.0 | | | |

TABLE 21

| Traditional starting materials and/or frits | | Glass-ceramic | Glaze I | Glaze II |
|---|---|---|---|---|
| | | GC8 | 30 | 50 |
| $SiO_2$ | 54.0 | | 70 | 50 |
| $Al_2O_3$ | 26.0 | | | |
| MgO | 0.1 | | | |
| CaO | 8.5 | | | |
| $Na_2O$ | 11.0 | | | |
| $K_2O$ | 0.2 | | | |
| $TiO_2$ | 0.2 | | | |

TABLE 22

| Traditional starting materials and/or frits | | Glass-ceramic | Glaze I | Glaze II |
|---|---|---|---|---|
| | | GC10 | 30 | 50 |
| $SiO_2$ | 62.0 | | 70 | 50 |
| $Al_2O_3$ | 6.3 | | | |
| MgO | 1.3 | | | |
| CaO | 14.0 | | | |
| $Na_2O$ | 0.5 | | | |
| $K_2O$ | 5.6 | | | |
| ZnO | 10.3 | | | |

TABLE 23

| Traditional starting materials and/or frits | | Glass-ceramic | Glaze I | Glaze II |
|---|---|---|---|---|
| | | GC11 | 30 | 50 |
| $SiO_2$ | 50.0 | | | |
| $Al_2O_3$ | 25.0 | | 70 | 50 |
| MgO | 10.0 | | | |
| $Na_2O$ | 7.0 | | | |
| $K_2O$ | 6.0 | | | |
| $TiO_2$ | 2.0 | | | |

EXAMPLE 3

Preparation of Glass-ceramic

In this case the powder is prepared according to Example 1 but only GC2 is used. The tile according to Example 1 is prepared applying the thermic cycle C1 reported in TABLE 24 wherein the $T_g$ and the $T_{c1}$ and $T_{c2}$ of the starting materials (GC2) are also indicated.

In TABLE 25 thermic cycles for the preparation of compound GC8 are reported; the $T_g$ and $T_c$ of GC8 are also indicated.

All the Glass-ceramics obtained via the described processes showed a typical superficial micro-structure presenting several crystalline and vitreous phases.

TABLE 24

GC 2 Starting product
$T_g = 825°$ C.
$T_{c1} = 966°$ C.
$T_{c2} = 1025°$ C.
Thermic cycles applied:

| B1 | | | C1 | | | C2 | | |
|---|---|---|---|---|---|---|---|---|
| Step min | total Time (min) | T (° C.) | Step min | Total Time 1 (min) | T (° C.) | Step min | Total Time (min) | T (° C.) |
| 0 | 0 | 25 | 0 | 0 | 25 | 0 | 0 | 25 |
| 35 | 35 | 350 | 35 | 35 | 350 | 35 | 35 | 350 |
| 30 | 65 | 350 | 30 | 65 | 350 | 30 | 65 | 350 |
| 55 | 120 | 900 | 55 | 120 | 900 | 55 | 120 | 900 |
| 30 | 150 | 900 | 30 | 150 | 900 | 30 | 150 | 900 |
| 8 | 158 | 980 | 8 | 158 | 980 | 25 | 175 | 1150 |
| 30 | 188 | 980 | 30 | 188 | 980 | 30 | 205 | 1150 |
| 17 | 205 | 1150 | 22 | 210 | 1200 | 30 | 205 | 1150 |
| 30 | 235 | 1150 | 30 | 240 | 1200 | | | |

TABLE 25

GC8 starting material
$T_g$: 740° C.
$T_c$ 934° C.
Thermic cycles applied:

| B1 | | | C1 | | | C2 | | |
|---|---|---|---|---|---|---|---|---|
| Step min | Total Time (min) | T (° C.) | Step min | Total Time (min) | T (° C.) | Step min | Total Time (min) | T (° C.) |
| 0 | 0 | 25 | 0 | 0 | 25 | 0 | 0 | 25 |
| 35 | 35 | 350 | 35 | 35 | 350 | 35 | 35 | 350 |
| 30 | 65 | 350 | 30 | 65 | 350 | 30 | 65 | 350 |
| 44 | 109 | 790 | 44 | 109 | 790 | 44 | 109 | 790 |
| 30 | 139 | 790 | 30 | 139 | 790 | 30 | 139 | 790 |
| 16 | 155 | 950 | 26 | 165 | 1050 | 36 | 175 | 1150 |
| 30 | 185 | 950 | 30 | 195 | 1050 | 30 | 205 | 1150 |

What is claimed is:

1. A glass-ceramic in the form of a powder which has the formula:

$$SiO_2—Me_2'''O_3—Me''O$$

wherein Me" is selected from the group consisting of Ca, Ba, Mg, Zn and mixtures thereof;
wherein Me'" is selected from the group consisting of Al, B and mixtures thereof and the weight percent of each of $SiO_2$;
$Me_2'''O_3$; and Me"O is:
  $SiO_2$=30–65%;
  $Me_2'''O_3$=5–less than 20%; and
  Me"O=5–40%.

2. A glass-ceramic as described in claim 1 having the following composition in weight percent which is selected from the group consisting of:
  $SiO_2$—ZnO—$Al_2O_3$ (51.6:39.7:8.7)
  $SiO_2$—CaO—BaO—$Al_2O_3$ (37.8:17.63:37.98:6.59);
  $SiO_2$—CaO—MgO—$Al_2O_3$ (47.95:23.55:9.3:19.2);
  $SiO_2$—BaO—MgO—$Al_2O_3$ (36.77:47.05:9.75:6.43); and
  $SiO_2$—CaO—$Al_2O_3$ (61:24:15).

3. Process for the preparation of glass ceramics from a powder mixture which has the formula:

$$SiO_2—Me_2'''O_3—Me''O$$

wherein Me" is selected from the group consisting of Ca, Ba, Mg, Zn and mixtures thereof;
wherein Me'" is selected from the group consisting of Al, B and mixtures thereof and the weight percent of each of $SiO_2$;
$Me_2'''O_3$; and Me"O is:
  $SiO_2$=30–65%;
  $Me_2'''O_3$=5–less than 20%; and
  Me"O=5–40% wherein: the starting materials are submitted to grinding, mixing and pressing steps for the production of porcelain stoneware to form a pressed powder mixture, and then firing said pressed powder mixture as follows: starting from room temperature said pressed powder mixture is heated by increasing the temperature from room temperature at the rate of 10°–30° C. per minute up to 350° C., to eliminate organic impurities, and thereafter increasing the temperature at a rate of 10°–30° C. per minute up to the $T_g$; maintaining the $T_g$ temperature for 0–120 minutes and thereafter increasing the temperature at a rate of 10°–30° C. per minute up to the $T_c$ where it is maintained for 0–several hours and optionally increasing the temperature at a rate of 10°–30° C. per minute up to the next $T_c$ and up to the final $T_c$; and after the highest $T_c$ has been reached, cooling the glass ceramic down to room temperature.

4. Porcelain Stoneware consisting of a glass-ceramic according to claim 1, wherein the mixture containing a traditional mixture of metal oxides $SiO_2$ (40–80), $Al_2O_3$ (5–40), MgO (0.1–10), CaO (0.1–10), $Na_2O$ (0.1–10), and $K_2O$ (0.1–10) in which said traditional metal oxides are expressed in percent by weight, mixed with a glass-ceramic selected from the group consisting of:
  $SiO_2$—ZnO—$Al_2O_3$ (51.6:39.7:8.7);
  $SiO_2$—CaO—BaO—$Al_2O_3$ (37.8:17.63:37.98:6.59);
  $SiO_2$—CaO—MgO—$Al_2O_3$ (47.95:23.55:9.3:19.2);
  $SiO_2$—BaO—MgO—$Al_2O_3$ (36.77:47.05:9.75:6.43); and
  $SiO_2$—CaO—$Al_2O_3$ (61:24:15); represents 5%–65% by weight of the total weight of said Porcelain Stoneware.

5. Porcelain Stoneware consisting of a crystalline powder having a chemical formula as recited in claim 2, in admixture with a mixture of metal oxides comprising $SiO_2$ (40–80 wt. %), $Al_2O_3$ (5–40 wt. %), MgO (0.1–10 wt. %), CaO (0.1–10 wt. %), $Na_2O$ (0.1–10wt. %), and $K_2O$ (0.1–10 wt. %), whereby said crystalline powder represents 5% to 60% by weight of said Porcelain Stoneware.

6. Ceramic glaze consisting of a glass-ceramic $SiO_2$ ZnO $Al_2O_3$ according to claim 2, and metal oxides of the formula:
  $SiO_2$ 59.0% by weight;
  $Al_2O_3$ 10.0% by weight;
  MgO 1.0% by weight;
  CaO 7.0% by weight;
  $Na_2O$ 8.0% by weight;
  $K_2O$ 3.0% by weight; and
  $ZrO_2$ 12.0% by weight;
    the weight being based on the total weight of all the components; wherein the weight ratio of $SiO_2$ ZnO $Al_2O_3$ to the metal oxides is 30 to 70.

7. Ceramic glaze consisting of a glass-ceramic $SiO_2$ CaO BaO $Al_2O_3$ according to claim 2 which is mixed with a traditional metal oxide mixture consisting essentially of $SiO_2$ 60.0 wt. %; $Al_2O_3$ 17.1 wt. %; MgO 2.4 wt. %; $Na_2O$ 6.2 wt. %; $K_2O$ 4.3 wt. %; $ZrO_2$ 8.0 wt. %; $TiO_2$ 2.0 wt. %; in a ratio by weight of 30 to 70 of the glass-ceramic to said traditional metal oxide mixture.

8. Ceramic glaze consisting of a glass-ceramic $SiO_2$ CaO MgO $Al_2O_3$ according to claim 2 which is mixed with a metal oxide mixture consisting essentially of $SiO_2$ 54.0 wt. %; $Al_2O_3$ 26.0 wt. %; MgO 0.1 wt. %; CaO 8.5 wt. %; $Na_2O$ 11.0 wt. %; $K_2O$ 0.2 wt. %; $TiO_2$ 0.2 wt. % in a ratio by weight of 30 to 70 of the glass-ceramic to said metal oxide mixture.

9. Ceramic glaze consisting of a glass-ceramic $SiO_2$ CaO ZnO $Al_2O_3$ according to claim 2 which is mixed with a metal oxide mixture consisting essentially of $SiO_2$ 58.0 wt. %; $Al_2O_3$ 18.0 wt. %; MgO 2.5 wt. %; CaO 10.5 wt. %; $Na_2O$ 6.0 wt. %; $K_2O$ 5.0 wt. %; in a ratio by weight of 30 to 70 of the glass-ceramic to said metal oxide mixture.

10. Ceramic glaze consisting of a glass-ceramic $SiO_2$ BaO MgO $Al_2O_3$ according to claim 2 which is mixed with a metal oxide mixture consisting essentially of $SiO_2$ 62.0 wt.

%; $Al_2O_3$ 6.3 wt. %; MgO 1.3 wt. %; CaO 14.0 wt. %; $Na_2O$ 0.5 wt. %; $K_2O$ 5.6 wt. %; ZnO 10.3 wt. % in a ratio by weight of 30 to 70 of the glass-ceramic to said metal oxide mixture.

11. Ceramic glaze consisting of a glass-ceramic $SiO_2$ CaO $Al_2O_3$ according to claim 2 which is mixed with a metal oxide mixture consisting essentially of $SiO_2$ 50.0 wt. %; $Al_2O_3$ 25.0 wt. %; MgO 10.0 wt. %; $Na_2O$ 7.0 wt. %; $K_2O$ 6.0 wt. %; $TiO_2$ 2.0 wt. % in a ratio by weight of 30 to 70 of the glass-ceramic to said metal oxide mixture.

* * * * *